United States Patent Office 3,440,275
Patented Apr. 22, 1969

3,440,275
**DERIVATIVES OF α-DIHYDRODIMETHYLMU-
CONATES AND THEIR PREPARATION**
George Suld, Springfield, Pa., assignor to Sun Oil Company, Philadelphia, Pa., a corporation of New Jersey
No Drawing. Filed June 23, 1966, Ser. No. 559,736
Int. Cl. C07c 67/00, 69/62
U.S. Cl. 260—484                                19 Claims

ABSTRACT OF THE DISCLOSURE

This invention relates to derivatives of dimethylmuconic acid which are α-dihydrodimethylmuconates and to a process for preparing the same. These α-dihydrodimethylmuconates contain a chlorine or bromine group at the alpha position and an alkoxy group at the beta position. More specifically, they conform to the formula $$(COOR_1)CCH_3{:}CH{\cdot}CH(OR_2){\cdot}CCH_3(X)(COOR_1)$$

hereinafter fully described.

BACKGROUND

The unsaturated diacid, α,α'-dimethylmuconic acid, can exist in three isomeric forms, viz. cis-cis, trans-trans, and cis-trans, which can be depicted by the following structural formulas:

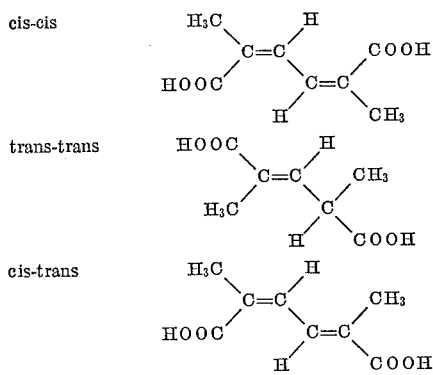

The preparation of each of these isomeric forms has been described in the prior art by Elvidge et al., J. Chem. Soc. pp. 1026–1033 (1952). These authors also disclosed the preparation of dimethyl esters of the three isomeric diacids.

Dialkyl esters of the three isomers of α,α'-dimethylmuconic acid can be prepared by conventional esterification techniques, such as by reacting the diacid with an alkanol or dialkyl sulfate in the presence, respectively, of an acidic or basic catalyst. Higher esters can be made from the dimethyl esters by transesterification of the same with a higher alcohol in the presence of a basic catalyst.

DESCRIPTION OF THE INVENTION

The present invention provides a method whereby dialkyl esters of α,α'-dimethylmuconic acid, which can be of the cis-cis, trans-trans or cis-trans form or mixtures thereof, are converted to haloalkoxy derivatives. The halogen group and the alkoxy group become attached to adjacent carbon atoms at the alpha and beta positions, respectively, whereby the double bond originally located at those carbon atoms disappears due to the haloalkoxylation reaction.

More specifically, the products of the reaction are α-dihydrodimethylmuconates having the formula $$(COOR_1)CCH_3{:}CH{\cdot}CH(OR_2){\cdot}CCH_3(X)(COOR_1)$$

wherein $R_1$ is a primary, secondary or tertiary alkyl group having 1–20 carbon atoms, $R_2$ is a primary or secondary alkyl group having 1–5 carbon atoms, and X is chlorine or bromine. These products are colorless oily materials and are useful as components in cutting oils, as fungicides and nematocides, and as herbicides and defoliants.

The reactants in the process comprise three types of materials as follows:

(1) A dialkyl ester of α,α'-dimethylmuconic acid in which the alkyl groups correspond to $R_1$. These substituents can be any alkyl radical having 1–20 carbon atoms, either straight chain or branched, and including primary, secondary and tertiary alkyl groups. It is usually preferred that $R_1$ be a primary alkyl group since the dimethylmuconate esters generally are more readily prepared from primary alkanols. An increase in the size of the $R_1$ group tends to increase the hydrocarbon solubility of the products. Consequently, in some cases as when the product is to be blended with hydrocarbon oil to prepare soluble oils, it may be desirable to have a relatively large $R_1$ group, e.g., decyl, lauryl, or stearyl. In other cases as, for example, when the product is to be used as a herbicide or defoliant, $R_1$ groups of lower molecular weight, such as methyl, ethyl, propyl, butyl or pentyl, generally are more desirable; and in such cases it is preferable that $R_1$ be the same alkyl group as $R_2$.

(2) A primary or secondary alkanol having 1–5 carbon atoms, namely, methanol, ethanol, propanol, isopropanol, n-butanol, isobutanol, and the pentanols other than 2-methyl-2-butanol. Generally methyl and ethyl alcohols are the preferred alkanols.

(3) Chlorine or bromine in elemental form.

The process of the invention comprises:

(a) admixing the selected dialkyl ester of α,α'-dimethylmuconic acid with the selected alkanol;

(b) contacting the mixture at 0–100° C. with elemental chlorine or bromine, whereby haloalkoxylation of the ester occurs;

(c) and thereafter recovering product comprising dialkyl - α,α' - dimethyl - α - halo - β - alkoxy - α - dihydromuconate from the reaction mixture.

In this process the normal expectation heretofore might well have been that the alkanol would merely function as a solvent and that straight halogenation of the unsaturated diester charge would occur. Surprisingly, it has been found that the reaction proceeds in a different way. The alkanol also enters into the reaction, so that a haloalkoxy adduct is formed by reaction adjacent one of the double bonds. The reaction can be illustrated by the following equation using chlorine:

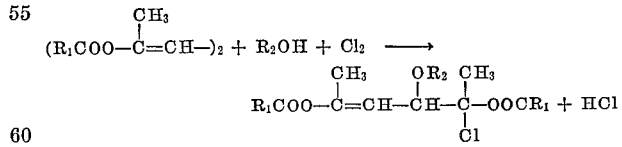

From the equation it can be seen that chlorination occurs at the alpha position and alkoxylation at the beta position, as a result of which only one double bond is left in the product. Thus the product is dialkyl-α,α'-dimethyl-α-chloro-β-alkoxy-α-dihydromuconate.

When the starting diester corresponds to the cis-cis isomer of α,α'-dimethylmuconic acid, the product obtained is the cis form. In this case the haloalkoxylation reaction proceeds rapidly so that maximum yield of this cis product may, for example, be obtained in 15–20 minutes when the chloromethoxylation reaction is conducted at room temperature. This form of the product can be illustrated as follows:

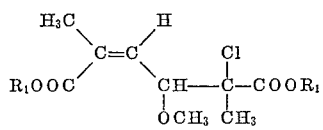

The product represented by this single structural formula may actually be a plurality of individual cis products in view of the possibility of conformational isomers or diastereomers depending upon the stereochemistry of the chlorine and methoxy additions to the double bond. In any event the cis product generally appears as a single peak in VPC analysis, so that for all practical purposes it can be considered as a single material.

When the trans-trans diester is used as reactant, a trans product is obtained which also may be a mixture of conformational isomers or diastereomers. In this case the reaction occurs more slowly than in the case of cis-cis material, requiring, for example, 50–60 minutes for chloromethoxylation at room temperature to reach maximum yield of the desired adduct. This trans product can be represented as follows:

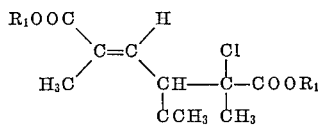

In cases where cis-trans diester is employed as starting material, the haloalkoxylation reaction tends to occur preferentially at the cis position and to give mainly the trans product.

Both the cis products and the trans products are liquid oily materials that can vary from relatively low to relatively high viscosity depending upon the size of the $R_1$ and $R_2$ groups selected. Increasing the number of carbon atoms in either or both of these groups within the ranges herein specified tends to increase the solubility of the product in hydrocarbons and also to increase the viscosity of the product.

In carrying out the reaction the starting diester of $\alpha,\alpha'$-dimethylmuconic acid, which diester is usually a crystalline solid, is admixed with the selected alcohol which serves both as a solvent and a reactant. Preferably the diester charge is dissolved completely in the alcohol before the reaction is started, although this is not essential. The mixture is agitated and contacted intimately with the elemental halogen at any temperature in the range of 0–100° C., preferably at a temperature in the range of 0–40° C. The haloalkoxylation reaction is mildly exothermic and means should be provided for maintaining the temperature at the desired level as the reaction occurs. As previously indicated, the rate at which formation of the desired adduct occurs depends upon which form of isomer is used as the diester feed. The rate also depends, of course, on the reaction temperature employed. The content of the desired adduct in the reaction mixture builds up, reaches a maximum and thereafter will drop if the reaction is continued. Contacting of the halogen with the mixture preferably is stopped when the amount of desired adduct product has reached the maximum. Several higher boiling reaction products (not specifically identified) are generally formed during the reaction and their amounts tend to increase as reaction proceeds. These higher boiling materials are probably more highly halogenated reaction products. By stopping the reaction at the stage where the desired adduct has been maximized, only minor amounts of these higher boiling by-products are obtained.

After the desired stage of reaction has been reached, the addition of chlorine or bromine is stopped and the mixture is worked up to recover the $\alpha$-dihydrodimethylmuconate adduct. Excess alcohol is stripped from the mixture as well as any unreacted halogen, thus giving a crude product comprising mainly the desired adduct in admixture with minor amounts of any unreacted diester feed (which boils below the adduct) and the higher boiling by-products. For some purposes, e.g., use in cutting oils, the adduct need not be further purified. If desired, the adduct can be separated from the other constituents by vacuum distillation.

The following examples illustrate the invention more specifically:

EXAMPLE I

In this example the dimethyl ester of trans-trans-$\alpha,\alpha'$-dimethylmuconic acid was used as charge. A solution of 5 g. of this diester in 70 ml. of abs. methanol (7.3 wt. percent solution) was prepared in a 3-neck flask equipped with a condenser, sparger and stirrer and the flask was maintained at about 21° C. by immersion in a thermostatically controlled water bath. Chlorine was sparged into the mixture at a rate of about 30 ml./min. At intervals as the reaction proceeded small samples of the mixture were taken and subjected to VPC analysis to show the course of the reaction. Compositions of the products in weight percent are shown in Table I.

TABLE I.—CHLOROMETHOXYLATION OF TRANS-TRANS-DIMETHYLMUCONATE

| Reaction time, min. | Product composition by VPC, wt. percent ||||||
|---|---|---|---|---|---|---|
| | Unreacted diester | Peak A (adduct) | Peak B | Peak C | Peak D | Peak E |
| 11 | 68 | 32 | | | | |
| 17 | 49 | 42 | 9 | | | |
| 24 | 36 | 56 | 6 | 2 | | |
| 32 | 18 | 71 | 6 | 5 | | |
| 40 | 7 | 78 | 8 | 7 | | |
| 50 | 5 | 82 | 6 | 7 | | |
| 75 | 5 | 78 | 6 | 7 | 7 | 14 |
| 95 | 5 | 72 | 6 | 9 | 9 | 13 |

The Peak A material was shown to be the desired adduct, namely, trans-dimethyl-$\alpha,\alpha'$-dimethyl-$\alpha$-chloro-$\beta$-methoxy-$\alpha$-dihydromuconate. This was done in a repeat run in which the reaction was stopped at one hour time. The reaction mixture was worked up by blowing with nitrogen to remove any excess chlorine, evaporating solvent under reduced pressure, redissolving in benzene, extracting with aqueous sodium thiosulfate, drying the solution with calcium sulfate, evaporating the benzene and subjecting to gas chromatography. The Peak A material was separately collected from the chromatograph effluent and was analyzed by IR, NMR and mass spectra. Carbon-hydrogen analysis and a molecular weight determination (osmometric) were also made. This material was a colorless oil of relatively low viscosity.

These analyses showed that it was the trans adduct designated above. The carbon-hydrogen analysis and molecular weight were as follows:

Calculated for $C_{11}H_{17}ClO_5$ (percent): C, 50.0; H, 6.45. Mol weight: 264. Found (percent): C, 50.38; H, 6.68. Mol weight: 270.

The results listed in Table I show that as the diester reacts, the concentration of the adduct product (Peak A) increases to a maximum and thereafter drops if the addition of the halogen is continued. Higher boiling products, which presumably are more highly chlorinated materials, are formed and the total amount thereof increases continuously as the reaction proceeds. It can be seen that, under the conditions employed in this run, the maximum yield of the desired trans-adduct was obtained after about 50 minutes reaction time.

EXAMPLE II

Another run was made in essentially the same manner as for Example I except that the cis-cis dimethyl ester of $\alpha,\alpha'$-dimethylmuconic acid was employed and a 3.0 wt. percent solution thereof in methanol was used. The reaction was again carried out at 21° C. In this case the reac-

TABLE II.—CHLOROMETHOXYLATION OF CIS-CIS-DIMETHYLMUCONATE

| Reaction Time, min. | Product composition by VPC, wt. percent | | | | | |
|---|---|---|---|---|---|---|
| | Unreacted diester | Peak A' (Adduct) | Peak B' | Peak C' | Peak D' | Peak E' |
| 7 | 52 | 48 | | | | |
| 18 | 1 | 90 | 10 | | | |
| 24 | | 44 | 35 | 13 | 4 | 4 |

The several VPC peaks here shown were not identical with Peaks A, B, C, D and E of Table I. The adduct (Peak A') was isolated and analyzed as in Example I. It also was a colorless oil and had the following C-H analysis: Calculated for $C_{11}H_{17}ClO_5$ (percent): C, 50.0; H, 6.45. Found (percent): C, 50.37; H, 6.16.

Specifically it was determined to be cis-dimethyl-$\alpha,\alpha'$-dimethyl-$\alpha$-chloro-$\beta$-methoxy-$\alpha$-dihydromuconate.

When diesters having other $R_1$ groups as herein defined are substituted for the dimethyl esters of the foregoing examples, or when other primary or secondary alcohols that have five or less carbon atoms are substituted for methanol, the reaction proceeds in the same way and analogous results are obtained. Likewise, analogous results are obtained when bromine is substituted for chlorine. The resulting bromine-containing adducts tend to be somewhat more viscous than those obtained by chlorination.

The invention claimed is:

1. $\alpha$-Dihydrodimethylmuconates having the formula

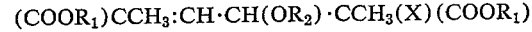

$(COOR_1)CCH_3{:}CH{\cdot}CH(OR_2){\cdot}CCH_3(X)(COOR_1)$ wherein $R_1$ is an alkyl group having 1–20 carbon atoms, $R_2$ is a primary or secondary alkyl group having 1–5 carbon atoms and X is chlorine or bromine.

2. A compound according to claim 1 wherein X is chlorine.

3. A compound according to claim 1 wherein X is bromine.

4. A compound according to claim 2 wherein $R_2$ is methyl or ethyl.

5. A compound according to claim 4 wherein $R_1$ is a primary alkyl group.

6. A compound according to claim 3 wherein $R_2$ is methyl or ethyl.

7. A compound according to claim 6 wherein $R_1$ is a primary alkyl group.

8. A compound according to claim 1 which is a trans isomer.

9. A compound according to claim 8 which is trans-dimethyl - $\alpha,\alpha'$ - dimethyl - $\alpha$ - halo - $\beta$ - methoxy - $\alpha$ - dihydromuconate.

10. A compound according to claim 1 which is a cis isomer.

11. A compound according to claim 10 which is cis-dimethyl - $\alpha,\alpha'$ - dimethyl - $\alpha$ - halo - $\beta$ - methoxy - $\alpha$ - dihydromuconate.

12. Process for making compounds as defined in claim 1 which comprises:
 (a) admixing a dialkyl ester of $\alpha,\alpha'$-dimethylmuconic acid, in which the alkyl groups correspond to $R_1$, in an alkanol in which the alkyl group corresponds to $R_2$;
 (b) contacting the mixture at 0–100° C. with elemental chlorine or bromine, whereby haloalkoxylation of said ester occurs;
 (c) and recovering said $\alpha$-dihydrodimethylmuconate from the reaction mixture.

13. Process according to claim 12 wherein chlorine is used in step (b).

14. Process according to claim 12 wherein bromine is used in step (b).

15. Process according to claim 13 wherein said alkanol is methanol or ethanol.

16. Process according to claim 15 wherein $R_1$ is a primary alkyl group.

17. Process according to claim 14 wherein said alkanol is methanol or ethanol.

18. Process according to claim 17 wherein $R_1$ is a primary alkyl group.

19. Process according to claim 12 wherein step (b) is carried out at a temperature in the range of 0–40° C.

References Cited

UNITED STATES PATENTS 2,428,955   10/1947   Baker et al. _____ 260—484

OTHER REFERENCES

Elvidge et al., J. Chem. Soc. pp. 1026–1033 (1952).

LORRAINE A. WEINBERGER, *Primary Examiner.*

ALBERT P. HALLUIN, *Assistant Examiner.*

U.S. Cl. X.R.

167—22; 71—106; 252—56